(12) United States Patent
Balakrishnan

(10) Patent No.: US 12,703,781 B2
(45) Date of Patent: Aug. 11, 2026

(54) SEASHELL AND MULTI-WALLED CARBON NANOTUBE REINFORCED NYLON COMPOSITES

(71) Applicant: Prince Mohammad Bin Fahd University, Dhahran (SA)

(72) Inventor: Deepanraj Balakrishnan, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 99 days.

(21) Appl. No.: 18/647,582

(22) Filed: Apr. 26, 2024

(65) Prior Publication Data

US 2025/0333576 A1 Oct. 30, 2025

(51) Int. Cl.

*C08K 3/04* (2006.01)
*C08K 3/22* (2006.01)
*C08K 3/26* (2006.01)

(52) U.S. Cl.

CPC ................ *C08K 3/041* (2017.05); *C08K 3/22* (2013.01); *C08K 3/26* (2013.01); *C08K 2003/2206* (2013.01); *C08K 2003/265* (2013.01); *C08K 2201/003* (2013.01); *C08K 2201/004* (2013.01); *C08K 2201/005* (2013.01); *C08K 2201/011* (2013.01); *C08K 2201/014* (2013.01)

(58) Field of Classification Search

None
See application file for complete search history.

(56) References Cited

U.S. PATENT DOCUMENTS 7,951,237 B2 5/2011 Zikeli et al.

FOREIGN PATENT DOCUMENTS

| | | | | | |
|---|---|---|---|---|---|
| CA | 2955235 | C | * | 9/2020 | ............. B33Y 70/10 |
| CN | 105440672 | A | | 3/2016 | |
| JP | 2023-329 | A | | 1/2023 | |
| KR | 10-2139051 | B1 | | 7/2020 | |
| KR | 10-2557878 | B1 | | 7/2023 | |
| WO | WO-2013091111 | A1 | * | 6/2013 | ........... C08K 11/005 |
| WO | 2023/118351 | A1 | | 6/2023 | |

OTHER PUBLICATIONS

English translation of Tazawa et al. (WO 2023/181942). (Year: 2023).*

Dodkey et al. ; A comparative study on the effect of nano seashell, multiwall carbon nanotubes and nano alumina on mechanical and impact properties of bidirectional Kevlar/epoxy composite ; International Conference on Materials Science and Engineering (ICMSE 2022) ; 2022 ; 15 Pages.

Sahoo et al. ; Complex catalysed green synthesis and characterization of P(AN-co-MMA)/prawn shell powder biocomposite; Materials Today: Proceedings, vol. 47, Part 5 ; 2021 ;2 Pages.

* cited by examiner

*Primary Examiner* — Ronak C Patel
(74) *Attorney, Agent, or Firm* — Oblon, McClelland, Maier & Neustadt, L.L.P.

(57) ABSTRACT

A composite including a thermoplastic polyamide resin, multi-walled carbon nanotubes (MWCNTs), and seashells (SSs). The particles of the SSs have an average size of less than 100 micrometers (μm). The composite includes 80-99 wt. % of the thermoplastic polyamide resin, 0.1-1 wt. % of the MWCNTs, and 1-20 wt. % of the SSs, based on a total weight of the composite. The MWCNTs and particles of the SSs are dispersed in a matrix of the thermoplastic polyamide resin. The composite has a tensile strength of greater than 90 megapascals (MPa).

14 Claims, 16 Drawing Sheets

SEASHELL AND MULTI-WALLED CARBON NANOTUBE REINFORCED NYLON COMPOSITES

STATEMENT OF PRIOR DISCLOSURE BY INVENTOR

Aspects of the present disclosure are described in D. Balakrishnan "Environmental sustainability through the utilization of seashell wastes in the development of MWCNT-reinforced nylon 66 composites" Carbon Letters; 2023; 34; 731-742, incorporated herein by reference in its entirety.

STATEMENT OF ACKNOWLEDGEMENT

Support provided by the Prince Mohammad Bin Fahd University is gratefully acknowledged.

BACKGROUND

Technical Field

The present disclosure is directed to a reinforced composite, specifically a composite including seashell (SS) waste and multi-walled carbon nanotubes (MWCNT), and a method of preparation thereof.

Description of Related Art

The description of the related prior art provided herein is for the purpose of generally presenting the context of the disclosure. The work of the presently named inventors, to the extent described in this background section, as well as aspects of the description that may not otherwise qualify as prior art at the time of filing, are neither expressly nor impliedly admitted as prior art against the present invention.

Improved alloys and composites are important in meeting the qualities needed for durable materials for use in certain areas such as aeronautical, maritime, and transportation sectors. Since specific qualities of materials used to produce the composite can be retained, composites are a modifiable alternative to alloys. Composites are materials described as a mixture of two or more elements that differ in shape or structure with various distinctive phases and tangible interfaces. The dispersed phases in composites are distributed in a continuous medium known as a matrix, and the dispersed phases retain their originality or are identified after processing. The selection of matrix phases and reinforcement depends on the type of application and processing methods.

Polymer matrix composites (PMC) can be easily produced on a large scale. The matrix ingredient in PMC systems can be a thermoplastic or thermosetting resin. The advantages of using thermoplastic resins as a matrix material are that parts can be joined and made by heating, and components can be remolded and recycled. Apart from this, they have high toughness and impact resistance. Problems associated with thermoplastics are high processing temperatures and stiffness. However, the PMCs can be easily modified by adding in different components.

PMCs produced with matrices such as polyamide and nylon, and materials such as short glass fibers, multi-walled carbon nanotubes, calcium carbonate, and boron, resulted in a wide range of properties with improvements and deterioration of mechanical and physical properties such as tensile strength, melt viscosity, storage modulus, and impact strength. Therefore, there exists a need for a PMC with improved properties. In addition, the PMC may include a recycled material to avoid accumulation of waste and improve environmental friendliness.

Although a few literature reports reveal the use of different reinforcement agents in polymer composites, there still exists a need to develop degradable polymer composites with improved strength/mechanical properties in a cost-effective and environmentally friendly manner. Accordingly, an object of the present disclosure is to provide a polymer composite using bio-wastes available abundantly in nature, such as seashells (SSs), with improved mechanical properties.

SUMMARY

In an exemplary embodiment, a composite is described. The composite includes a thermoplastic polyamide resin, multi-walled carbon nanotubes (MWCNTs), and seashells (SSs). The particles of the SSs have an average size of less than 100 micrometers (μm). The composite includes 80-99 wt. % of the thermoplastic polyamide resin, 0.1-1 wt. % of the MWCNTs, and 1-20 wt. % of the SSs, based on a total weight of the composite. The MWCNTs and particles of the SSs are dispersed in a matrix of the thermoplastic polyamide resin. The composite has a tensile strength of greater than 90 megapascal (MPa).

In some embodiments, the particles of the SSs have an average size of 70-80 μm.

In some embodiments, the particles of the SSs include at least one of calcite and aragonite.

In some embodiments, the particles of the SSs are homogeneously dispersed in the matrix of the thermoplastic polyamide resin.

In some embodiments, the thermoplastic polyamide resin is nylon 66.

In some embodiments, the composite has a smooth morphology with regularly spaced protrusions from the particles of the SSs.

In some embodiments, the SSs are chemically bonded to the thermoplastic polyamide resin.

In some embodiments, the MWCNTs have an average diameter of 10-20 nanometers (nm).

In some embodiments, the MWCNTs have an average length of 3-8 μm.

In some embodiments, the composite has a flexural strength of greater than 100 MPa.

In some embodiments, the composite has a Shore D hardness of at least 100.

In some embodiments, the composite has a Vicat softening point of at least 270° C.

In some embodiments, the composite has an elongation of less than 45%.

In some embodiments, the composite includes 87 wt. % of the thermoplastic polyamide resin, 1 wt. % of the MWCNTs, and 12 wt. % of the SSs, based on a total weight of the composite.

In some embodiments, an automotive door panel is described including the composite.

In another exemplary embodiment, a method of making the composite is described. The method includes extruding a mixture of the thermoplastic polyamide resin, the MWCNTs, and the SSs to form a strand material. The method further includes pelletizing the strand material to form pellets. Finally, the method includes injection molding the pellets to form the composite.

In some embodiments, the method includes extruding the mixture at a temperature of 120-170° C.

In some embodiments, the method includes injection molding the pellets at a temperature of 150-200° C.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
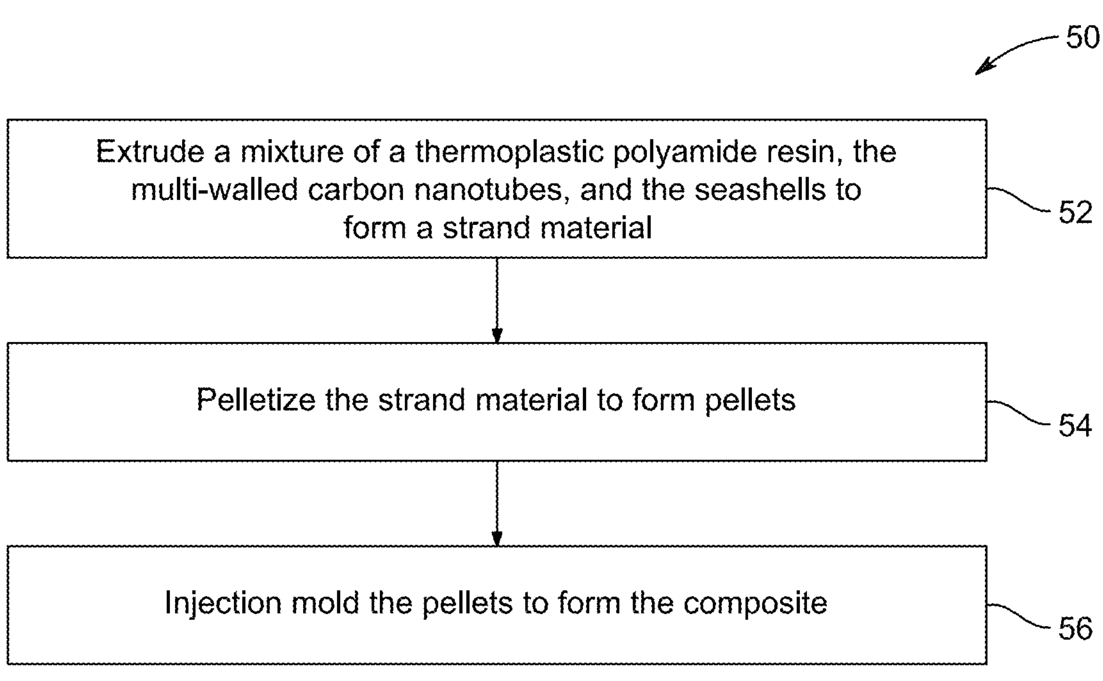
FIG. 1A is a flowchart depicting a method of forming a nylon 66-multi-walled carbon nanotube (MWCNT)-seashell (SS) hybrid nanopolymer composite (also referred to as composite), according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all embodiments of the disclosure are shown.

Where a numerical limit or range is stated herein, the endpoints are included. Also, all values and subranges within a numerical limit or range are specifically included as if explicitly written out.

In the drawings, like reference numerals designate identical or corresponding parts throughout the several views. Further, as used herein, the words “a,” “an” and the like generally carry a meaning of “one or more,” unless stated otherwise.

Furthermore, the terms “approximately”, “approximate”, “about,” and similar terms generally refer to ranges that include the identified value within a margin of 20%, 10%, or preferably 5%, and any values therebetween.

The use of the terms “include,” “includes”, “including,” “have,” “has,” or “having” should be generally understood as open-ended and non-limiting unless specifically stated otherwise.

As used herein, “particle size” may be thought of as the length or longest dimension of a particle.

As used herein, the term “composite” refers to an amalgamation of two materials with distinct physical and chemical properties.

As used herein, the term “density” of a material refers to its mass per unit volume. Density is the measure of how much mass is contained in a given volume. It is an intrinsic property of an object.

As used herein, the term “milling” refers to the process of grinding or pulverizing larger materials to achieve a specific level of fineness.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

Aspects of the present disclosure are directed to a composite including a thermoplastic polyamide resin, multi-walled carbon nanotubes (MWCNTs), and seashells (SS) to form a polymer-MWCNT-SS hybrid nanopolymer composite. The amount of SS in the composite is varied to determine the effect on the properties of the composite. The composite of the present disclosure demonstrates improved bonding strength and mechanical and thermal properties.

According to the first aspect, the present disclosure relates to a composite that includes a thermoplastic polyamide resin, multi-walled carbon nanotubes (MWCNTs), and seashells (SSs). Thermoplastic polyamide (PA) resins are thermoplastic polymers with high strength and heat resistance. PA is a polymer with repeating units linked by amide bonds where the amide bonds have the general formula R—C(═O)—NR'R", where R, R', and R" represent any group. All polyamides are made by the formation of an amide function to link two molecules of monomer together. The monomers can be amides themselves. Both these kinds of precursors give a homopolymer. Polyamides are easily copolymerized, and thus many mixtures of monomers are possible which can in turn lead to many copolymers. Suitable examples of polyamides include nylon 6, nylon 46, and nylon 66. In a preferred embodiment, the thermoplastic polyamide resin is nylon 66.

Nylon 66 is a thermoplastic aliphatic polyamide typically made by polycondensing adipic acid with hexamethylenediamine and has the following chemical structure. In the chemical structure n is an integer of 2-10,000, preferably 100-9,000, 200-8,000, 300-7,000, 400-6,000, 500-5,000, 600-4,000, 700-3,000, 800-2,000 or about 1,000.

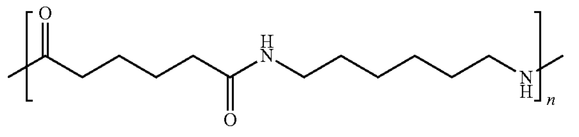

Nylon 66 has a strong tensile strength, excellent sliding qualities, a significant melting point, excellent electrical insulation, toughness, elasticity, and abrasion resistance. Further, nylon 66 has moderate solvent tolerance but poor weatherability and discolors in the air at high temperatures. Up to 27 degrees Celsius (° C.), good mechanical characteristics are retained. Also, nylon 66 has decent hydrophilicity; moisture works as a plasticizer, improving the polymer's elasticity and durability. Nylon 66 is frequently utilized in the manufacture of gear wheels, piston guides, friction strips, cam discs, impact plates, and other components. It has a melting temperature of 265° C., which is significant for synthetic fiber but not as high as aramids like Kevlar. Its lengthy molecular chain provides additional hydrogen bonding sites, resulting in chemical springs, and making it particularly robust. In a preferred embodiment, the Nylon 66 of the present disclosure has 83 MPa tensile strength, 2.81 GPa flexural modulus, 105 MPa strength in flexural, 65.6° C. heat deflection temperature, a thermal expansion coefficient of $8.1\times10^{-5}$° C., mold shrinkage of 1.5%, and density 1.14 g/$cm^3$.

The composite further includes MWCNTs. MWCNTs are single-wall carbon nanotubes in a nested, tube-in-tube structure. MWCNTs have unusual electrical, physical, optical, chemical, and mechanical capabilities. Carbon nanotubes (CNTs) possess a larger surface area, high aspect ratios, and high mechanical strength. MWCNTs are environment-friendly materials and hence widely used in environmental applications, such as energy efficiency, environmental degradation, reuse of wastewater, and pollutant transformation. In some embodiments, the MWCNTs of the present disclosure have an average diameter of 10-20 nm, preferably 11-19 nm, preferably 12-18 nm, preferably 13-17 nm, and preferably 14-16 nm. In some embodiments, the MWCNTs have an average length of 3-8 μm, preferably 4-7 μm, and preferably 5-6 μm.

The composite further contains SSs. Seashells of different mollusks, such as oysters, clams, mussels, and scallops, are common in coastal regions and serve as a protective layer. Shells are expelled from the organism's exterior layer, known as the mantle, and are mainly calcium carbonate ($CaCO_3$). In a preferred embodiment, the SSs include at least 50% calcium carbonate, preferably 55%, 60%, 65%, 70%, 75%, 80%, 85%, 90%, 95%, or 99% calcium carbonate. In some embodiments, the SSs further include at least one of silicon dioxide, aluminum oxide, iron oxide, calcium oxide, or magnesium oxide.

In some embodiments, the particles of the SSs include at least one of calcite and aragonite. Calcite and aragonite are two separate minerals (i.e., with distinct crystal structures)) for $CaCO_3$. Aragonite is somewhat heavier and tougher than calcite (harder and denser than graphite but softer than diamond). In some embodiments, the SSs include mainly calcite, preferably at least 50% calcite, 60%, 70%, 80%, 90%, 95%, or 99% calcite. Shells have mechanical qualities, such as toughness and durability. The high mechanical qualities of shells are owing to their nanoscale form as well as the mix of organic and inorganic elements.

The SS may be collected from a seashore and the components of the shells vary based on the location, however the shells always include at least 50% calcium carbonate. After collecting the SS, the SS may be ground to particles of smaller size using any technique known in the art, such as but not limited to, grinding with a mortar and pestle or ball-milling. In a preferred embodiment, the particles of SS are ground to have an average size of less than 100 μm, preferably 90 μm, preferably 80 μm, preferably 70 μm, preferably 60 μm, and preferably 50 μm. In some embodiments, the particles of the SSs have an average size of 70-80 μm, preferably 71-79 μm, preferably 72-78 μm, preferably 73-77 μm, and preferably 74-76 μm. In a preferred embodiment, the particles of the SSs have an average size of 75 μm. In some embodiments, the SS are sifted through a mesh to ensure uniform particle size.

In some embodiments, the MWCNTs and particles of the SSs are dispersed in a matrix of the thermoplastic polyamide resin. In some embodiments, the particles of the SSs are homogeneously dispersed in the matrix of the thermoplastic polyamide resin. In other words, there are not aggregates of the SSs or the MWCNTs but instead they are uniformly distributed in the matrix. In some embodiments, the composite has a smooth morphology with regularly spaced protrusions from the particles of the SSs. The PA resin provides a smooth surface, and the SSs are uniformly protruding throughout. Protrusions are preferably spaced from 50 μm to 500 μm apart, preferably 75 μm to 400 μm, 100 μm to 300 μm or 150 μm to 200 μm apart. The protrusions may extend out of the surface of the material by 10-60 μm, preferable 20-50 μm or 30-40 μm.

In some embodiments, in the composite the SSs are physically dispersed in the PA matrix. In some embodiments, in the composite the SSs are chemically bonded to the thermoplastic polyamide resin. In some embodiments, in the composite the MWCNTs are physically dispersed in the PA matrix. In some embodiments, in the composite the MWCNTs are chemically bonded to the thermoplastic polyamide resin. In some embodiments, the chemical bonds are covalent bonds between the calcium carbonate of the SSs with the amide groups in the PA resin. In some embodiments, the chemical bonds are covalent bonds between the carbon or any hydroxyl groups on the MWCNTs with the amide groups in the PA resin. The bonding improves the interaction of the materials and thereby improves the overall physical and mechanical properties as will be discussed later. In a preferred embodiment, the composite only includes an amount of SSs which are able to undergo bonding and does not include excess.

In some embodiments, the composite includes 80-99 wt. % of the thermoplastic polyamide resin, preferably 81-98 wt. %, preferably 82-97 wt. %, preferably 83-96 wt. %, preferably 84-95 wt. %, preferably 85-94 wt. %, preferably 86-93 wt. %, preferably 87-92 wt. %, preferably 88-91 wt. %, and preferably 89-90 wt. % of the thermoplastic polyamide resin, 0.1-1 wt. % of the MWCNTs, preferably 0.2-0.9 wt. %, preferably 0.3-0.8 wt. %, preferably 0.4-0.7 wt. %, and preferably 0.5-0.6 wt. % of the MWCNTs, and 1-20 wt. %, of the SSs, preferably 2-19 wt. %, preferably 3-18 wt. %, preferably 4-17 wt. %, preferably 5-16 wt. %, preferably 6-15 wt. %, preferably 7-14 wt. %, preferably 8-13 wt. %, preferably 9-12 wt. %, and preferably 10-11 wt. % of the SSs, based on the total weight of the composite. In a preferred embodiment, the composite includes 87 wt. % of the thermoplastic polyamide resin, 1 wt. % of the MWCNTs, and 12 wt. % of the SSs, based on the total weight of the composite.

As used herein, the term 'tensile strength' is the highest stress an object can sustain without elongating, stretching, or pulling. A material's ultimate tensile strength is its peak opposition to fracture. In some embodiments, the composite has a tensile strength of greater than 90 megapascal (MPa), preferably 90-100 MPa, 91-99 MPa, 92-98 MPa, 93-97 MPa, or 94-96 MPa. In some embodiments, the addition of SSs into the composite increases the tensile strength up to 12% SSs.

As used herein, the term 'flexural strength' is a material property defined as the stress in a material just before it yields in a flexure test. It is also known as modulus of rupture, bend strength, or transverse rupture strength. In some embodiments, the composite has a flexural strength of greater than 100 MPa, preferably 100-115 MPa, preferably 101-114 MPa, 102-113 MPa, 103-112 MPa, 104-111 MPa, 105-110 MPa, 106-109 MPa, or 107-108 MPa. In some embodiments, the addition of SSs into the composite increases the flexural strength up to 12% SSs.

Material hardness is measured by resistance to indentation, scratch, and abrasion. As used herein, 'Shore hardness' is a property assessed by the indentation depth made on the substance by applying a predefined force, the measuring device being a durometer. In some embodiments, the composite has a Shore D hardness of at least 100, preferably 101, preferably 102, preferably 103, preferably 104, preferably 105, preferably 106, preferably 107, and preferably 108. In some embodiments, the addition of SSs into the composite increases the Shore hardness.

The softening temperature or point of polymer composites is a functional attribute. As used herein, the 'Vicat softening point' determines the point at which the material becomes weak and can break or fail. In some embodiments, the composite has a Vicat softening point of at least 270° C., preferably 271° C., preferably 272° C., preferably 273° C., preferably 274° C., preferably 275° C., preferably 276° C., preferably 277° C., and preferably 278° C. In some embodiments, the addition of SSs into the composite increases the Vicat softening point.

As used herein, the term 'impact strength' is a property defined as a material's tolerance to catastrophic collapse in the face of a spontaneously applied force, such as a falling object, collision, or an instant hit. In some embodiments, the composite has an impact strength of 1.2-1.7 J/s, preferably 1.3-1.6 J/s, or 1.4-1.5 J/s. In some embodiments, the addition of SSs into the composite increases the impact strength.

As used herein, the term 'coefficient of linear thermal expansion' is the increase in length per unit length when the temperature is raised 1° C. In some embodiments, the composite has a coefficient of linear thermal expansion of 2-4° $C.^{-1}$, preferably 2.2-3.8, 2.4-3.6, 2.6-3.4, 2.8-3.2, or about 3.0° $C.^{-1}$. In some embodiments, the addition of SSs into the composite decreases the coefficient of linear thermal expansion.

As used herein, the term 'heat-deflection temperature' refers to the temperature when a component begins to deform under load. In some embodiments, the composite has a heat-deflection temperature of 70-85° C., preferably 72-82° C., 74-80° C., or 76-78° C. In some embodiments, the addition of SSs into the composite increases the heat-deflection temperature.

The increased hardness and toughness lower the elongation of the composites. Good adhesion among SSs and polymer produces hard and brittle composites, reducing the composite material's elongation and restricting dislocation movement. In some embodiments, the composite has an elongation of less than 45%, preferably 40%, preferably 35%, preferably 30%, and preferably 25%.

Composite materials of the present disclosure are utilized in diverse applications, such as automotive and television set panels, toys, handles, and sports equipment. In some embodiments, the improvements in the physical and mechanical properties of the composites with the addition of the SSs, make the composite of the present disclosure suitable for use in certain areas such as aeronautical, maritime, and transportation sectors. In some embodiments, the composite is used in a structural body material of a car, airplane, or boat. In some embodiments, an automotive door panel includes the composite.

While not wishing to be bound to a single theory, it is thought that including the seashells in the composite provides improved hardness and toughness of the composite and the inclusion of MWCNTs, provides a higher surface area-to-volume ratio and bonding strength of nanoparticulates. However, if too much of the SSs are included in the composite, the properties decline due to poor bonding of the higher SS content with the polymer The greater bonding of SSs with the polymer or resin in the composite, results in increased temperature withstanding ability, making the composite more resistant to temperatures.

FIG. 1A illustrates a flow chart of a method 50 for making an embodiment of the composite of the present disclosure. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes extruding a mixture of the thermoplastic polyamide resin, the MWCNTs, and the SSs to form a strand material. The process of extrusion is utilized to fabricate objects with a uniform cross-sectional profile. Extrusion may be single-screw extrusion or twin-screw extrusion. In a preferred embodiment, extrusion is twin-screw extrusion. Twin-screw extrusion is widely used for blending, compounding, and decomposing polymeric materials. Because of the versatility of twin-screw extrusion machinery, this procedure may be tailored to the composition being processed.

The thermoplastic polyamide resin, the MWCNTs, and the SSs are fed into a barrel and are transported through the screws towards the end of the barrel. The screws are designed in such a way that they compress and heat the raw materials to a specific temperature range, thus converting it into a homogeneous mixture. This mixture is then forced through a die and is cooled to form the desired product. The twin screw design provides a high degree of mixing and kneading action, which enhances the plasticization and homogenization of the raw material. In some embodiments, the shape of the material following the extrusion process is any possible shape, preferably in the form of strands. In some embodiments, the extruding of the mixture is done at a temperature of 120-170° C., preferably 125-165° C., preferably 130-160° C., preferably 135-155° C., and preferably 140-150° C.

At step 54, the method 50 includes pelletizing the strand material to form pellets. Pelletization is the process of compressing or molding a material into the shape of a pellet. This technique is commonly used in various industries for different materials, including chemicals, iron ore, animal compound feed, plastics, and waste materials. The pellets may have any shape, preferably cylindrical.

At step 56, the method 50 includes injection molding the pellets to form the composite. Injection molding is a method that involves heating a polymer to an extremely plastic state and forcing it to flow below high pressure into a mold cavity, where it hardens. The molded element, known as molding, is then extracted from the die cavity. In some embodiments, the mold cavity has a shape of the application of the composite material. In a preferred embodiment, as previously described, the mold cavity has a shape of an automotive door panel. In some embodiments, the injection molding of the pellets is at a temperature of 150-200° C., preferably 155-195° C., preferably 160-190° C., preferably 165-185° C., and preferably 170-180° C. In a preferred embodiment, the injection molding of the pellets is at a temperature of 170° C.

EXAMPLES

The following examples demonstrate a nylon 66-multi-walled carbon nanotube (MWCNT)-seashell (SS) hybrid nanopolymer composite as described herein. The examples are provided solely for illustration and are not to be construed as limitations of the present disclosure, as many variations thereof are possible without departing from the spirit and scope of the present disclosure.

Example 1: Materials

Figure 1B:
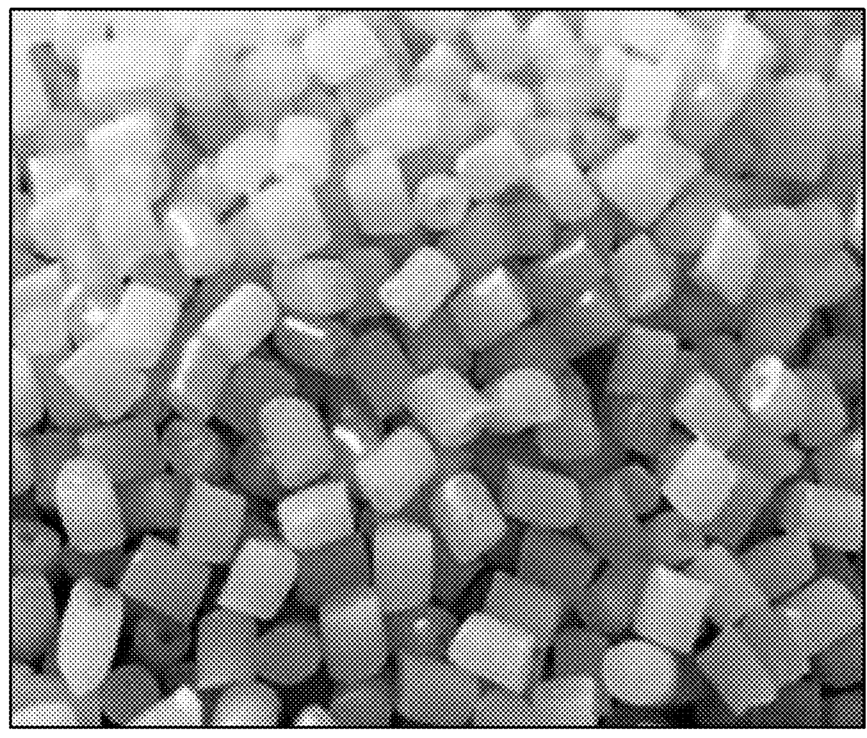
FIG. 1B is a pictorial image of nylon 66 pellets used for preparing the composite, according to certain embodiments.
Figure 1C:
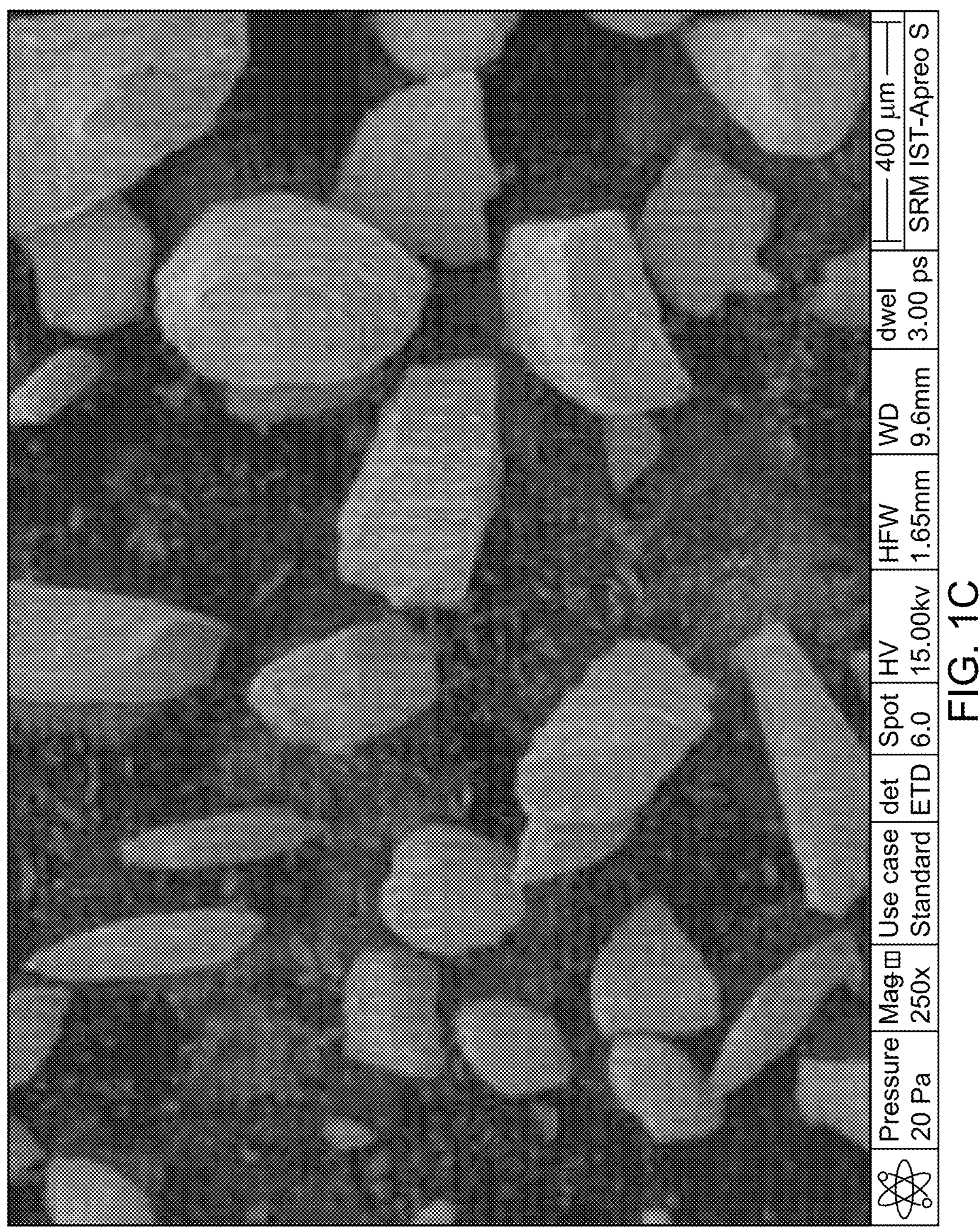
FIG. 1C is a scanning electronic microscopic (SEM) image of SS, according to certain embodiments.
Figure 1D:
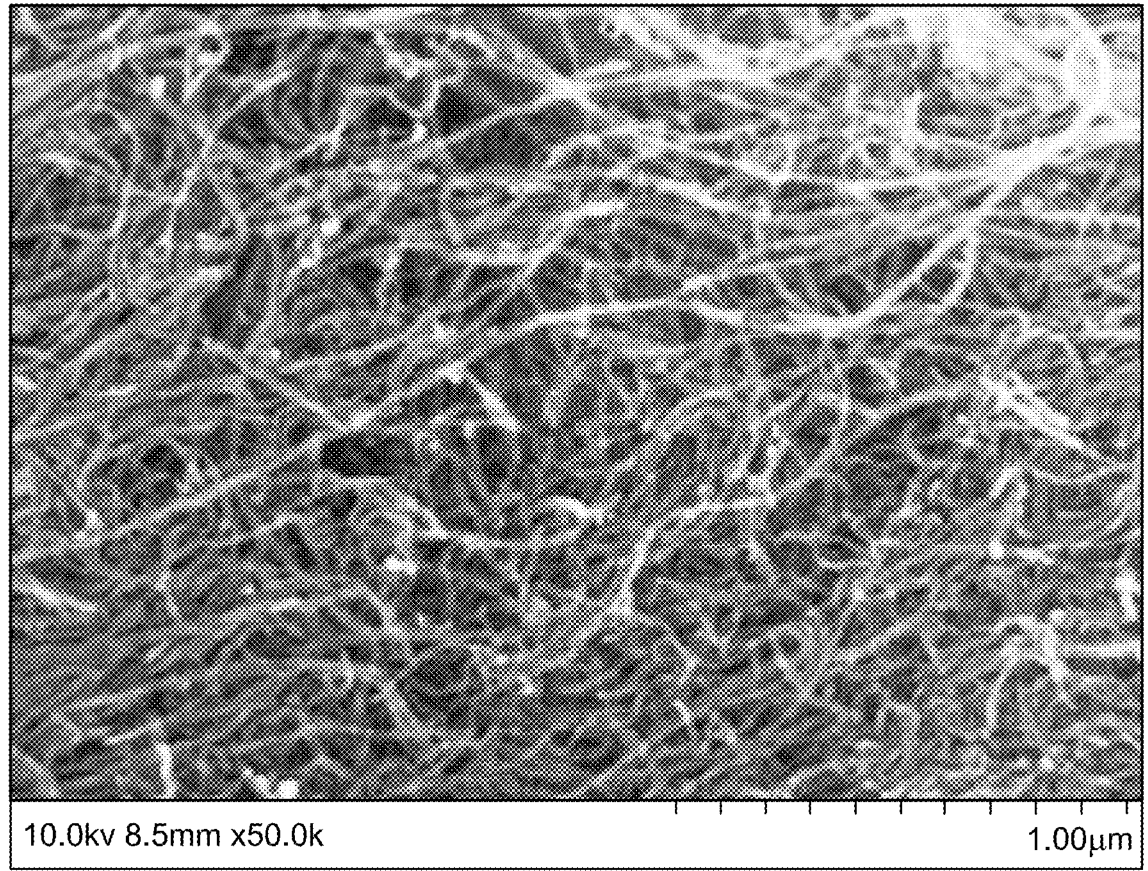
FIG. 1D is a SEM image of multi-walled carbon nanotubes (MWCNTs), according to certain embodiments.

The types of raw material used and the procedure for synthesis of the specimens are provided here. Nylon 66 was used as a thermoplastic polyamide resin. Nylon 66 has 83 megapascals (MPa) tensile strength, 2.81 gigapascals (GPa) flexural modulus, 105 MPa strength in flexural, 65.6 degrees Celsius (° C.) heat deflection temperature, a thermal expansion coefficient of $8.1\times10^{-5}$° C., mold shrinkage of 1.5%, and density 1.14 g/cm$^3$. The seashells (SSs) were collected at the Marakkanam beach in Tamil Nadu, India. The SSs were cleaned well and left to dry to eliminate any moisture remaining. Pellets of nylon 66 were purchased from M/s Srinivasa Polymer, Chennai, Tamil Nadu, India, and multi-walled carbon nanotube (MWCNTs) were acquired from Nanoshel India with 99% purity, 10-20 nanometers (nm) diameter, and 3-8 micrometers (μm) length. FIG. 1B is a pictorial image of nylon 66 pellets used to prepare the composite. FIG. 1C and FIG. 1D show scanning electronic microscopic (SEM) images of SS and MWCNTs, respectively.

Example 2: Preparation of Composite Material

Mechanical ball milling was used to minimize the size of the cleaned and dried SSs. Ball milling consists of balls made of mild steel with a 48 mm diameter to break down SSs into tiny fragments and, subsequently, powders. The pulverized SSs were next separated by micron size utilizing a sieve apparatus, and a particle of 75 microns was selected. After acquiring the SSs with needed sizes, nylon 66 and SSs were compounded in twin-screw extrusion equipment. The injection molding machine molds the samples for subsequent processing and examination. Twin-screw extrusion is widely used for blending, compounding, and decomposing polymeric materials. Because of the versatility of twin-screw extrusion machinery, this procedure may be tailored to the process composition. Injection molding is a method that involves heating a polymer to an extremely plastic state and forcing it to flow below high pressure into a mold cavity, where it hardens. The molded element, known as molding, is then extracted from the die cavity. The method yields elements that are virtually invariably net form.

Nylon 66, MWCNTs, and 75 micron-sized powdered SSs were combined in various weight ratios of 99:1:0 (nylon 66-MWCNT-SSs), 96:1:3, 93:1:6, 90:1:9, 87:1:12, and 84:1:15, sequentially, and the mix was fed through a co-rotating high-speed twin-screw extruder for uniform mixing. The conditions were as follows: screw 28 mm in diameter, 40 L/D ratio, 5 separate heat regions from the feed to the exit point at 125° C., 130° C., 140° C., 150° C., and 165° C., correspondingly, with 150 rpm screw speed. After 15 minutes of mixing, the product was extruded at a 10 mm/s rate via a 1 mm gauge strand die to obtain strands. The strands were further cooled in a water bath before being fed into a pelletizer produced composite pellets. Compounded pellets were vacuum-dried at 60° C. for 12 h before being preserved in an airtight polythene bag. The pellets extruded were fed to an injection molding machine at 170° C., 60 mm/s screw speed, 7 bar back pressure, and 30° C. temperature of the mold. To produce hybrid composite samples, injection molding equipment with a 30 mm diameter of the screw and a 20 L/D ratio was used. These fabricated composites were used in automotive door panels, TV set panels, toys, handles, and sports equipment.

Example 3: Composite Material Characterization Techniques

Mechanical testing is a way of testing and measuring the properties of materials, considered for all materials and products, especially those with potentially catastrophic failure models. Mechanical test specimens for performing tensile, flexural, shore hardness, and impact tests were produced as per ASTM D638, ASTM D790, ASTM D2240, and ASTM D256 standards, respectively. Thermal analysis is a compilation of quantitative strategies used to offer relevant data about materials by exploring property and structural changes caused by temperature variations. Thermal evaluation technologies are employed for a broad range of materials, and yet they appear to be particularly well-tailored to the investigation of polymers since these features are responsive to structural alterations that are distinctive to substances made up of large, prolonged chain molecules. For thermal analysis, the test specimens were prepared as per the ASTM D1525 standard to determine the Vicat softening point, ASTM D696 for determining the coefficient of linear thermal expansion, and ASTM D648 standard for heat deflection temperature.

Example 4: Morphological Characterization

Figure 2A:
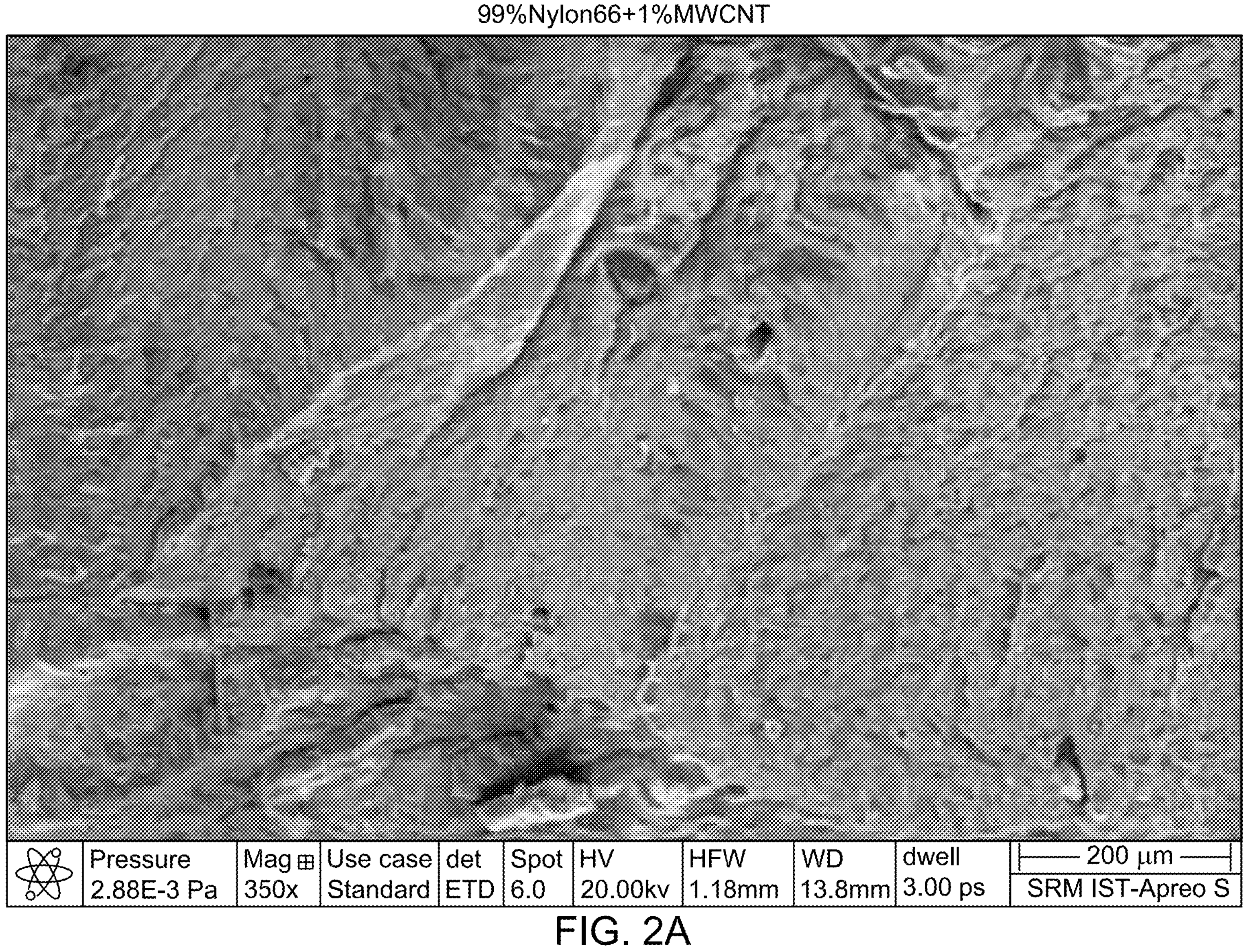
FIG. 2A is a SEM image of the composite including 99% nylon 66 and 1% MWCNT, according to certain embodiments.
Figure 2B:
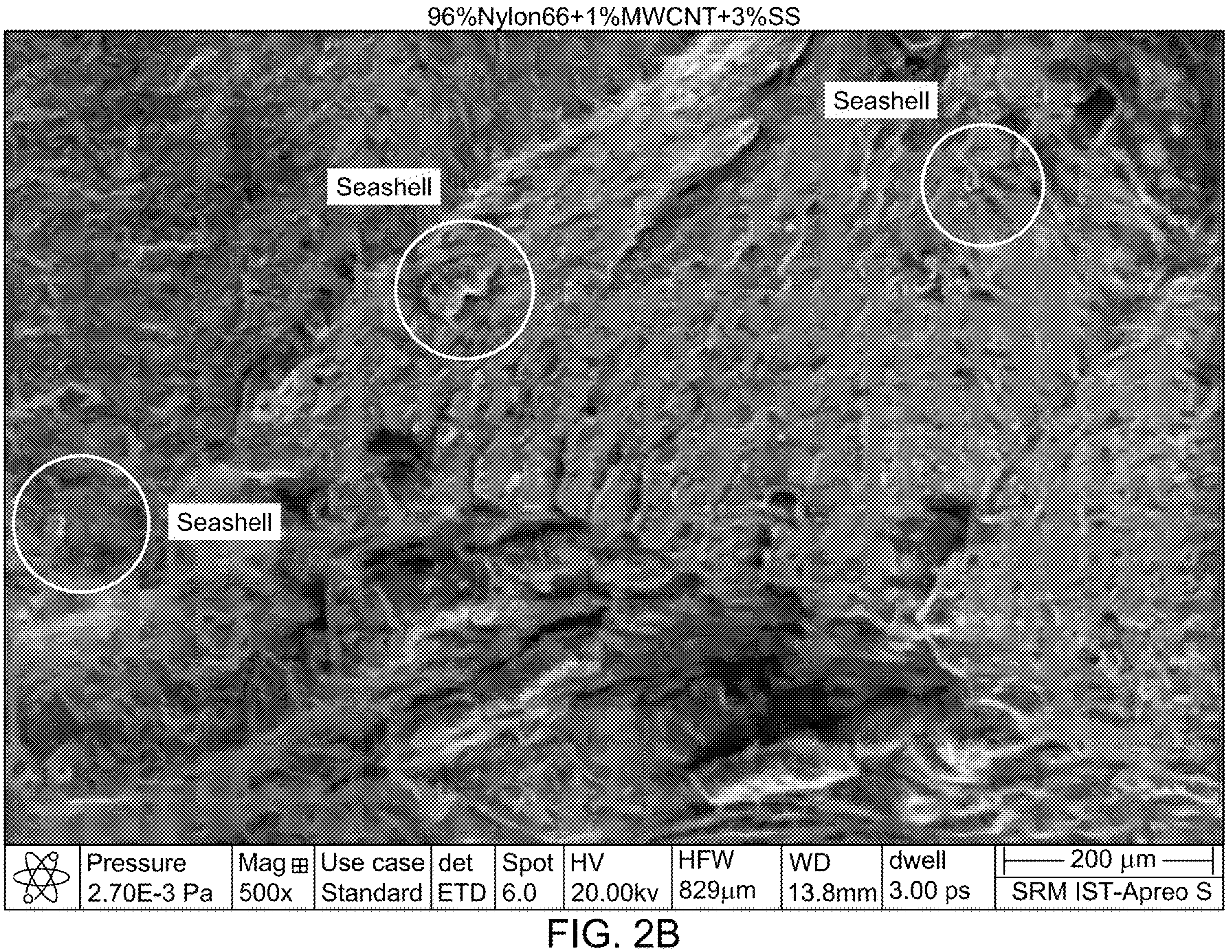
FIG. 2B is a SEM image of the composite including 96% nylon 66, 1% MWCNT, and 3% SS, according to certain embodiments.
Figure 2C:
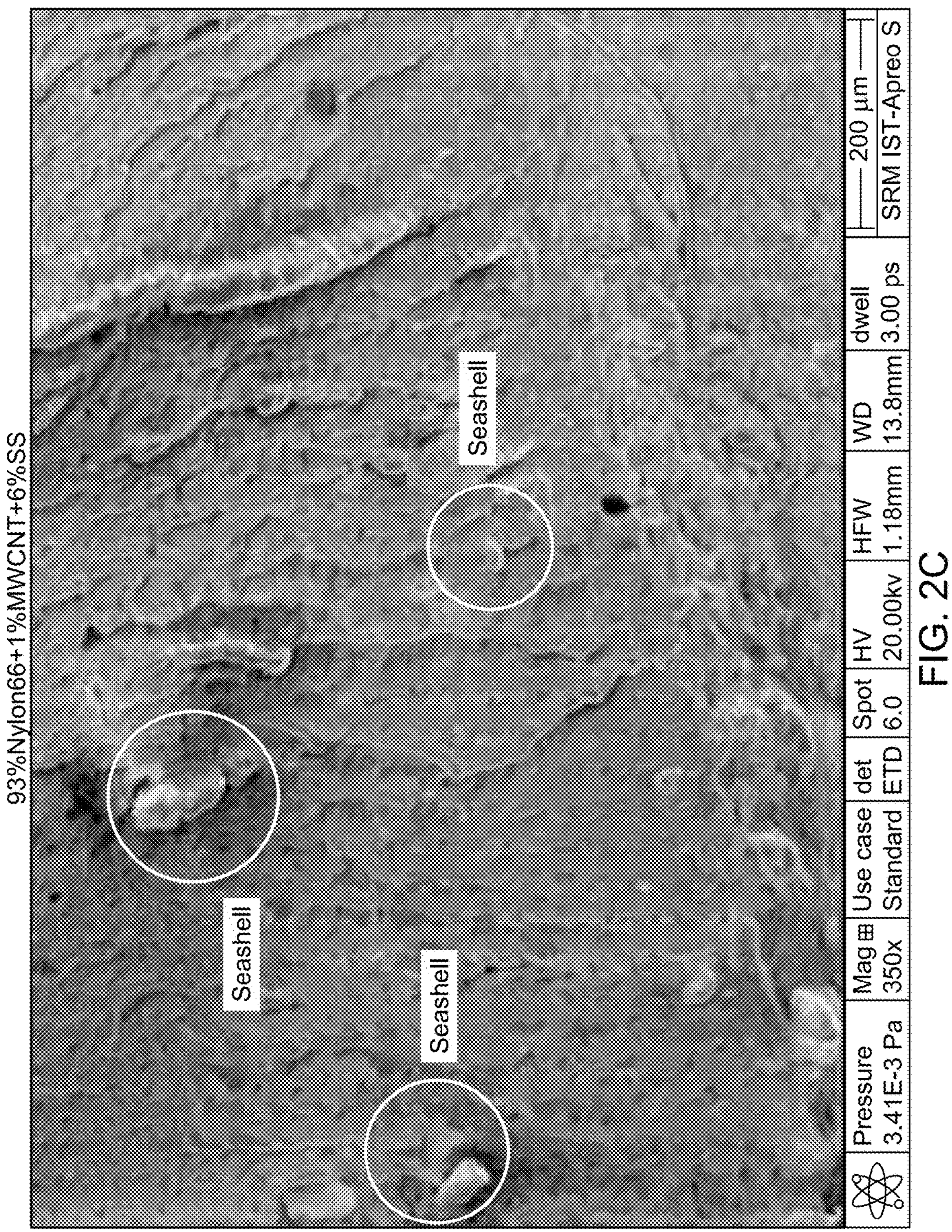
FIG. 2C is a SEM image of a composite including 93% nylon 66, 1% MWCNT, and 6% SS, according to certain embodiments.
Figure 2D:
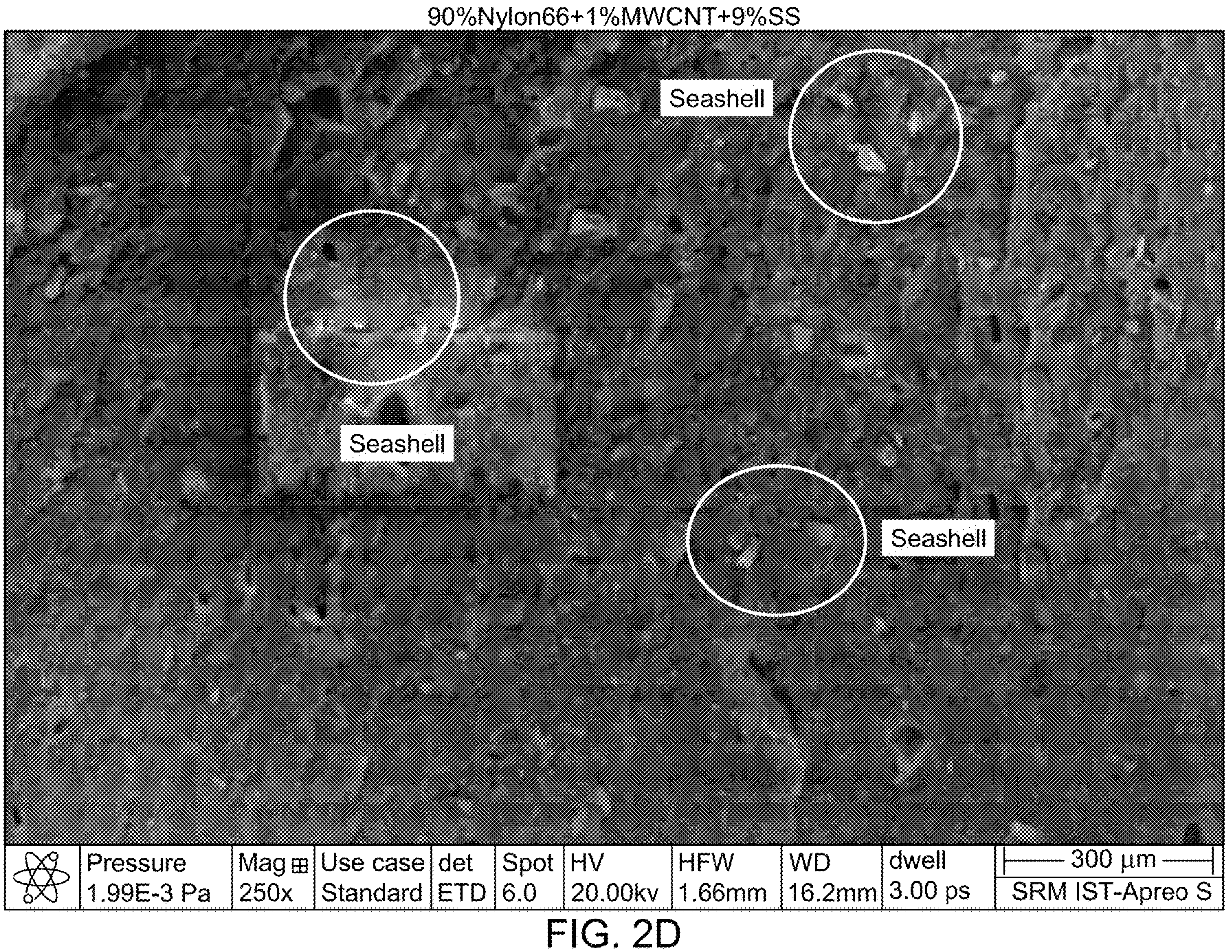
FIG. 2D is a SEM image of a composite including 90% nylon 66, 1% MWCNT, and 9% SS, according to certain embodiments.
Figure 2E:
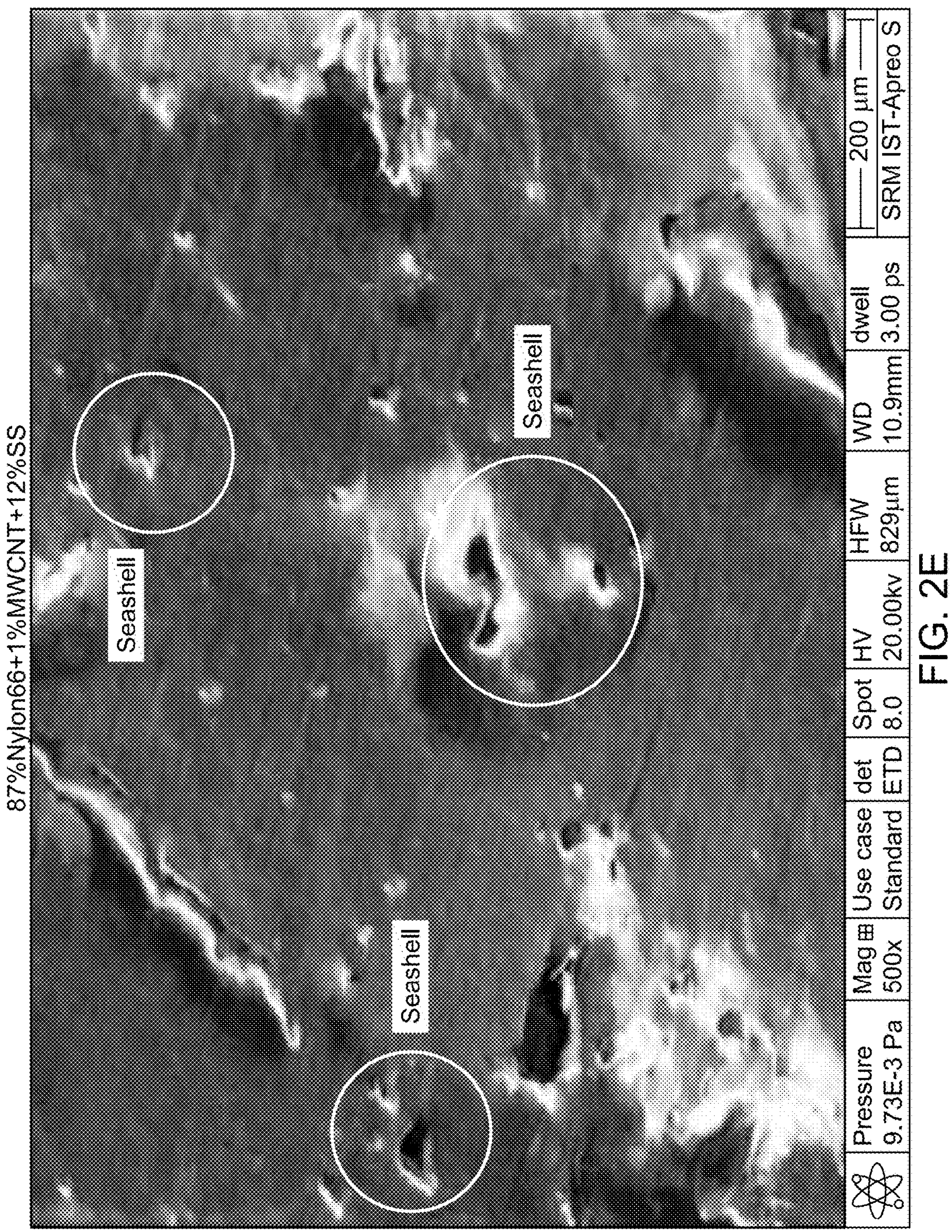
FIG. 2E is a SEM image of a composite including 87% nylon 66, 1% MWCNT, and 12% SS, according to certain embodiments.
Figure 2F:
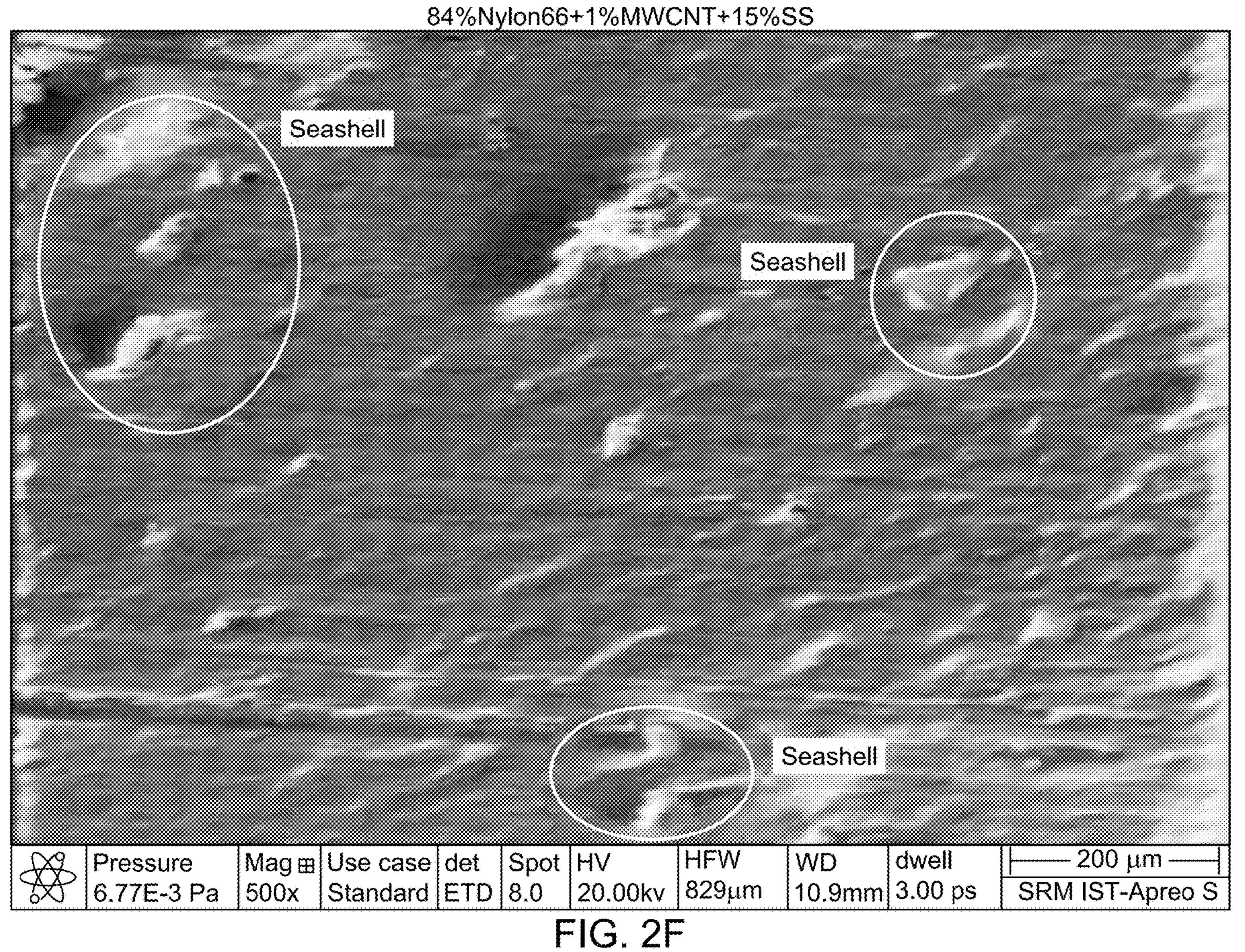
FIG. 2F is a SEM image of a composite including 84% nylon 66, 1% MWCNT, and 15% SS, according to certain embodiments.

The nylon 66 and SS particles were compounded in the twin-screw extruder, and specimens were prepared using an injection molding machine. FIGS. 2A-2F depict SEM pictures of PMCs containing SS particulates incorporated in a nylon 66 MWCNTs solidified matrix. The samples are labeled with the amounts of the Nylon 66, MWCNTs, and SS included in the composites. As shown in FIG. 2A a composite including 99% Nylon 66 and 1% MWCNT results in a smooth surface where the MWCNT are evenly distributed. In FIGS. 2B-2F the amount of SS was gradually increased to 3%, 6%, 9%, 12%, and 15%, respectively. The reinforcements (SSs) are evenly distributed, and as the number of SSs added to the nylon 66 matrix increases, many more SSs are noticeable. Nylon 66 fusion is also seen in some places. The SS were seen as protrusions from the smooth surface. The SS are not seen as large aggregates together but rather are distributed throughout the matrix.

Example 5: Tensile Strength Measurements

Tensile strength is the highest stress an object can sustain without elongating, stretching, or pulling. A material's ultimate tensile strength is its peak opposition to fracture. The ASTM D638 standard was followed for performing the tensile test.

Figure 3:
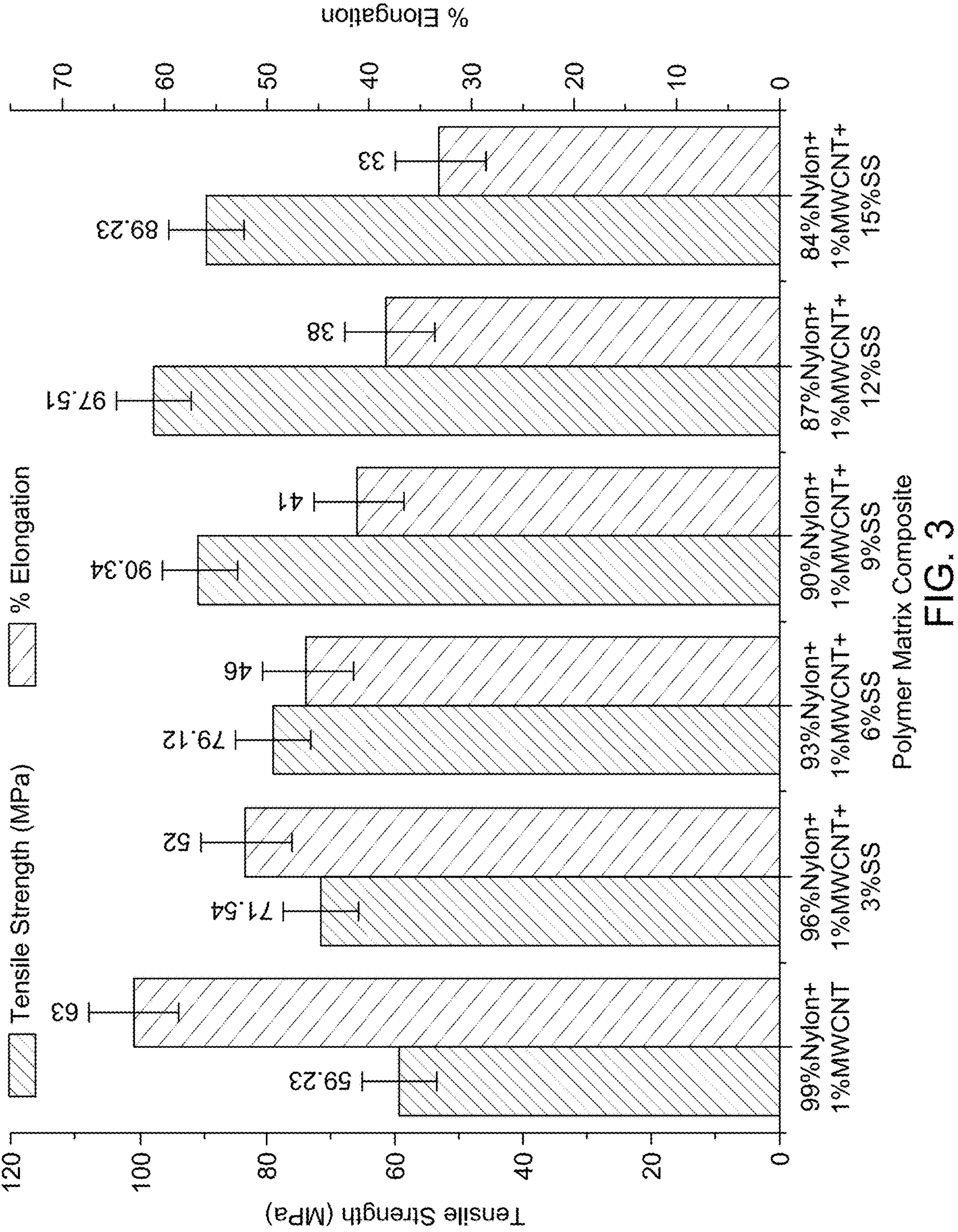
FIG. 3 shows tensile strength and elongation of the various composites including 0%, 3%, 6%, 9%, 12%, 15% of the SSs, according to certain embodiments.

In this analysis, the ultimate tensile strength of the fabricated composite generally increased with an increase in the weight fraction of SSs inside the nylon 66 matrix, as shown in FIG. 3, whereas the elongation of specimens lowered due to the increased hardness and toughness. With the inclusion of MWCNTs, tensile strength was considerably increased due to the higher surface area-to-volume ratio and bonding strength of nano particulates. Adding 3% SS to the nylon 66-1% MWCNT composite, the tensile strength increased further by 7.58 MPa, and until 12% addition of SSs, there was an increase in tensile strength. However, with the addition of 15% SSs, there was unexpectedly a decrease in tensile strength, which may be due to the poor bonding of higher SS content with the polymer, which made the nano-polymer composite weaker. Similarly, the elongation at the break during the tensile test decreases with the inclusion of MWCNTs and SSs, which was attributed to the hard particles and restriction of dislocation movement during tensile loading. Furthermore, good adhesion exists between the polymer and hard particulates, making the composite hard and brittle and reducing the elongation of the composite material.

Example 6: Flexural Strength Measurements

Flexural strength is a material property defined as the stress in a material just before it yields in a flexure test. It is also known as modulus of rupture, bend strength, or transverse rupture strength. Flexural testing, according to ASTM D790, was used to determine a material's flexibility or bending properties. A transverse beam test is also another name.

Figure 4:
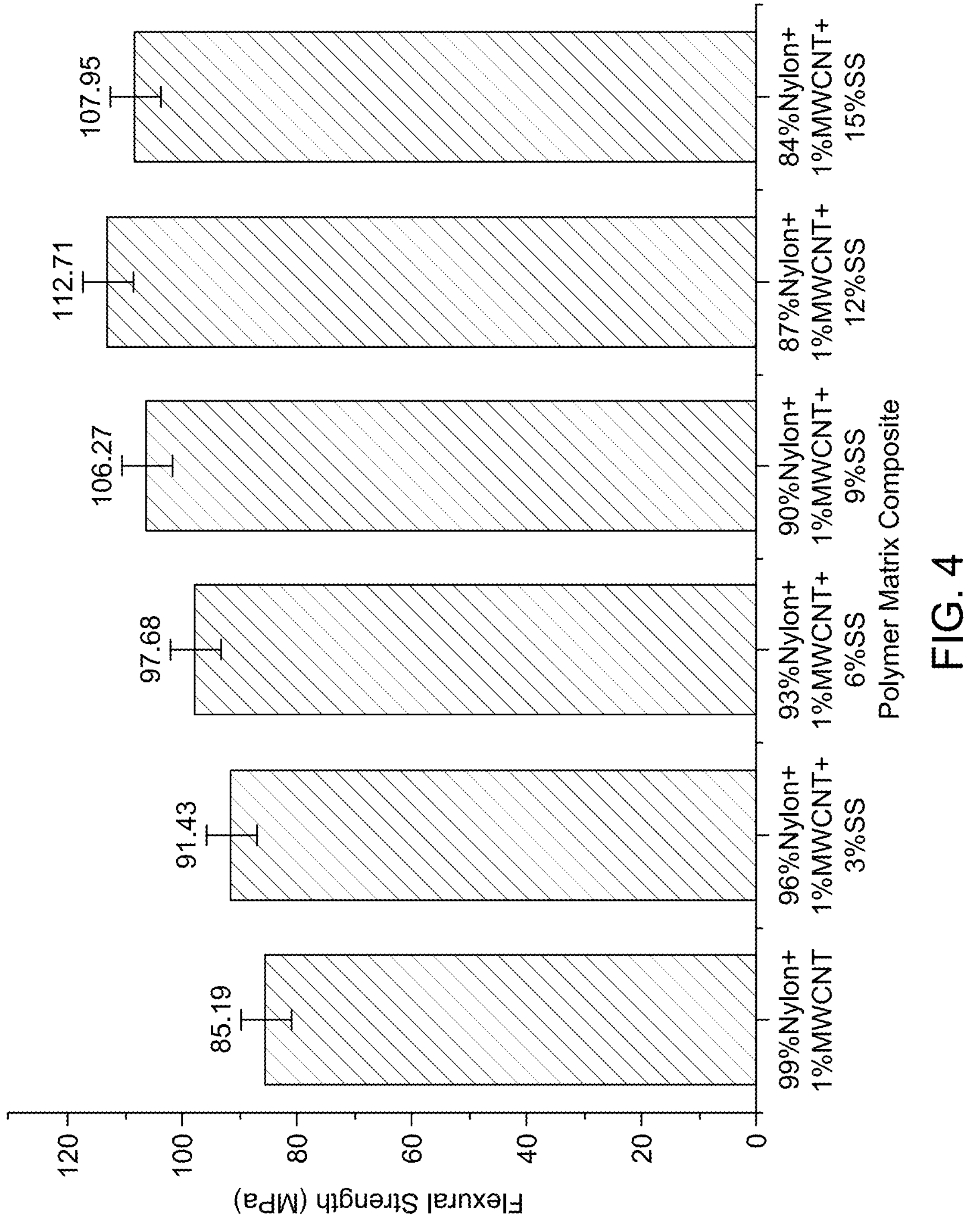
FIG. 4 shows flexural strength of various composites including 0%, 3%, 6%, 9%, 12%, 15% of the SSs, according to certain embodiments.

The flexural strength of the fabricated composite specimens of different SSs proportions is shown in FIG. 4. Due to higher bonding strength between the MWCNTs and hard SS particles and nylon 66 matrix, flexural strength increased with an increase in SS content up to 12% addition, and further addition resulted in degradation of mechanical strength. An increase in 7.32% of flexural strength was observed when increasing the SS content in the matrix material from 0 to 3% in nylon 66+1% MWCNT polymer composite. A further increase of 6.84% in flexural strength was noticed when the percentage of SS is increased to 6% in the nylon 66 matrix, with a further addition to 9% SS, there was an increase in flexural strength by 8.79%, 12% SS addition produces an additional increment in flexural strength by 6.06%. With a 15% SS addition, there was a decrease in flexural strength by 4.22%. The increase in flexural property indicated that higher load-bearing capacity was noticed with the inclusion of MWCNTS and SSs, most of the applied load was shared by the MWCNTs and SSs, and higher addition of SSs led to lower strength in flexural owing to improper bonding of SSs in nylon 66 matrix and propagation of dislocation density.

Example 7: Shore Hardness Measurements

Material hardness is measured by resistance to indentation, scratch, and abrasion. Shore hardness is assessed by the indentation depth on the substance by applying a predefined force, the measuring device being a durometer. Scale A is specifically for softer materials, and Scale D is for harder materials. ASTM D2240 standard was followed for determining the shore D hardness of the material with an 'A' scale.

Figure 5:
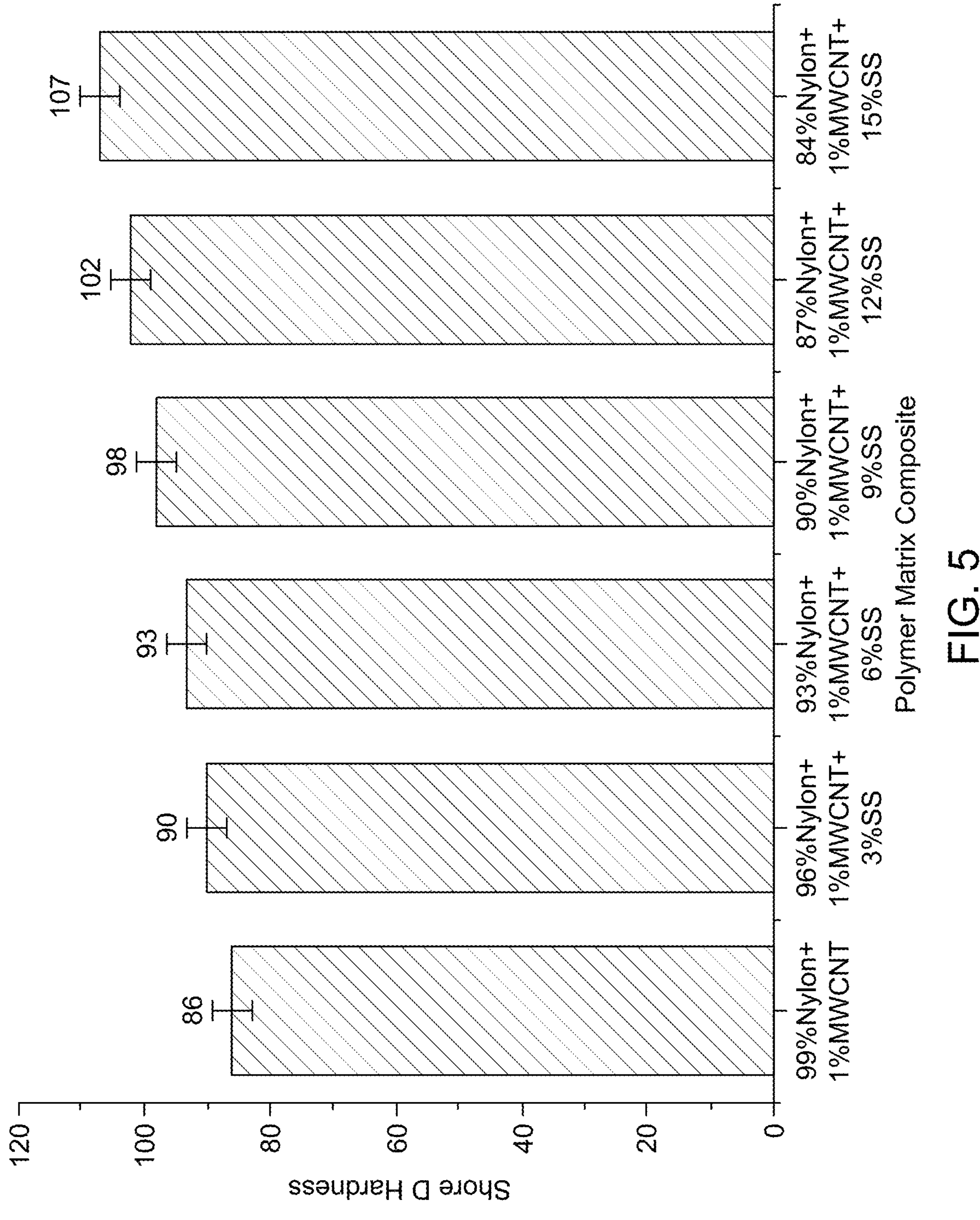
FIG. 5 shows shore hardness of various composites including 0%, 3%, 6%, 9%, 12%, 15% of the SSs, according to certain embodiments.

Observations from FIG. 5 show that as the percentage of SSs particles increased inside the matrix of nylon 66, shore D hardness increased. An increase of 2.33% was observed when the SS percentage increased from 0 to 3% in the MWCNT-added nylon 66 polymer composite. With a further rise in SS to 6%, shore D hardness was further increased by 1.82%. Further addition increased hardness by 2.79%, 2.71%, and 1.80% with the addition of 9, 12, and 15% SSs. This was due to the hard seashell particles reinforced in the matrix of nylon 66 and increasing the adhesive bonding between the matrix and reinforcement.

The tensile and flexural strength were reduced after 12% addition of SSs, whereas shore D hardness increases. This is because, after 12%, the bonding of particles with matrix material tends to lower due to higher addition, whereas the hardness is on the surface, which is exposed to the reinforcements, and hence, the hardness increases.

Example 8: Impact Strength Measurements

Impact experiments determine a material's tolerance to catastrophic collapse in the face of a spontaneously applied force, such as a falling object, collision, or an instant hit. The impact strength, or the energy consumed just before fracture, is measured in this test. The Izod experiment is commonly used to assess materials' relative or impact toughness and is used more as a comparative test. The standard followed for this test was the ASTM D256 standard.

Figure 6:
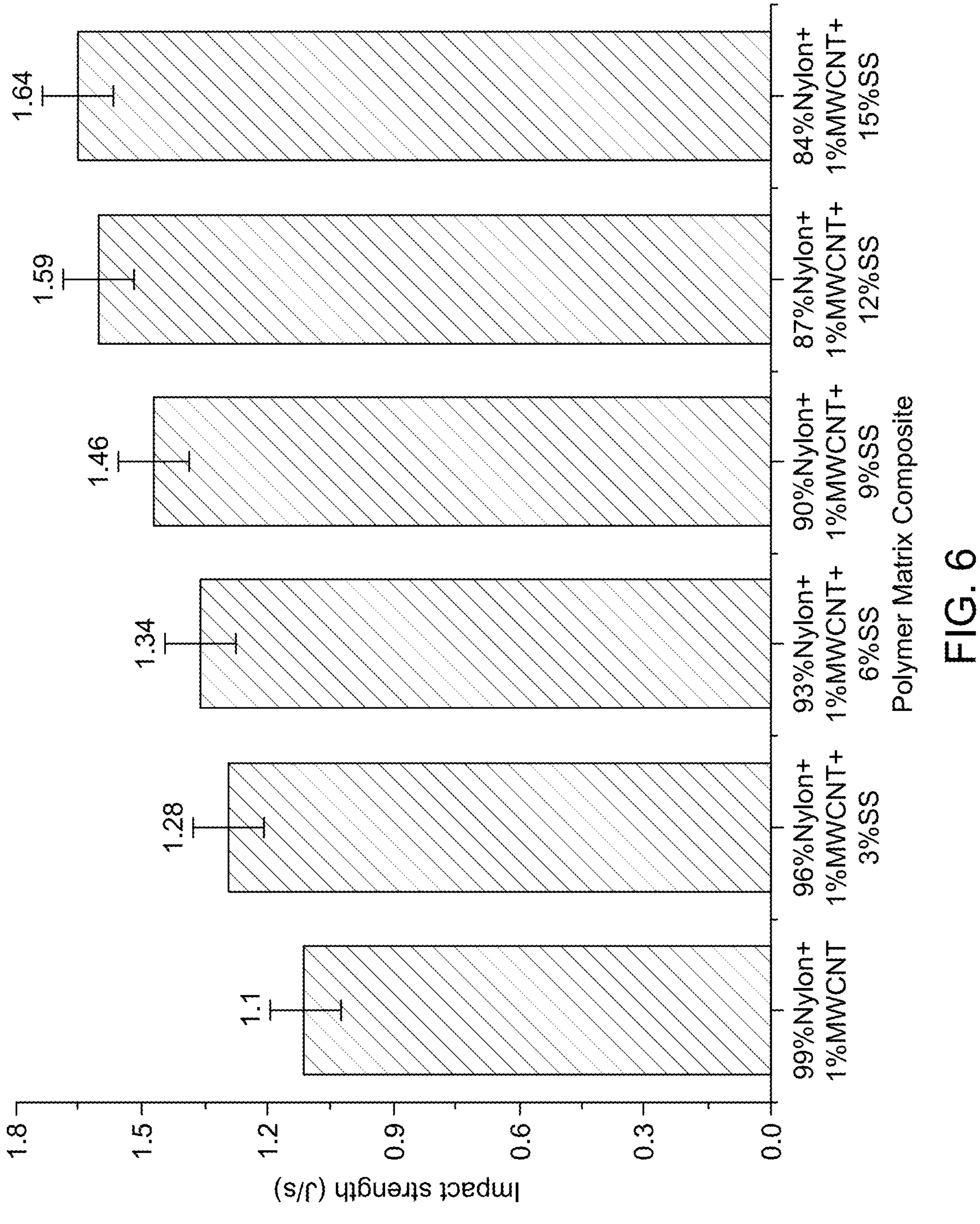
FIG. 6 shows impact strength of various composites including 0%, 3%, 6%, 9%, 12%, 15% of the SSs, according to certain embodiments.

The impact strength of the nylon 66 matrix composite does not show a noticeable deviation, as only a slight variation is observed, as shown in FIG. 6. It is observed from the results that the composite bears the sudden loads applied with the addition of SS reinforcements. While increasing the SSs percentage from 0 to 3%, an increase in impact strength of 16.36% was observed, and an increase of 4.69% in impact strength was obtained with an increase in SS content in nylon 66 by 6%. Adding 9% SSs in nylon 66-MWCNT polymer composite produces an impact strength of 1.46 QRs, which is 8.96% higher than the previous composition. An increase in impact strength by 8.90% and 3.14% was achieved by incorporating 12 and 15% SSs in the polymer composites. This increase in impact strength was due to the restriction of dislocations by the added MWCNTs and the SSs taking the load more than the matrix. With the inclusion of MWCNTs and SSs, the mechanical strength increases.

Example 9: Softening Point Measurements

Figure 7:
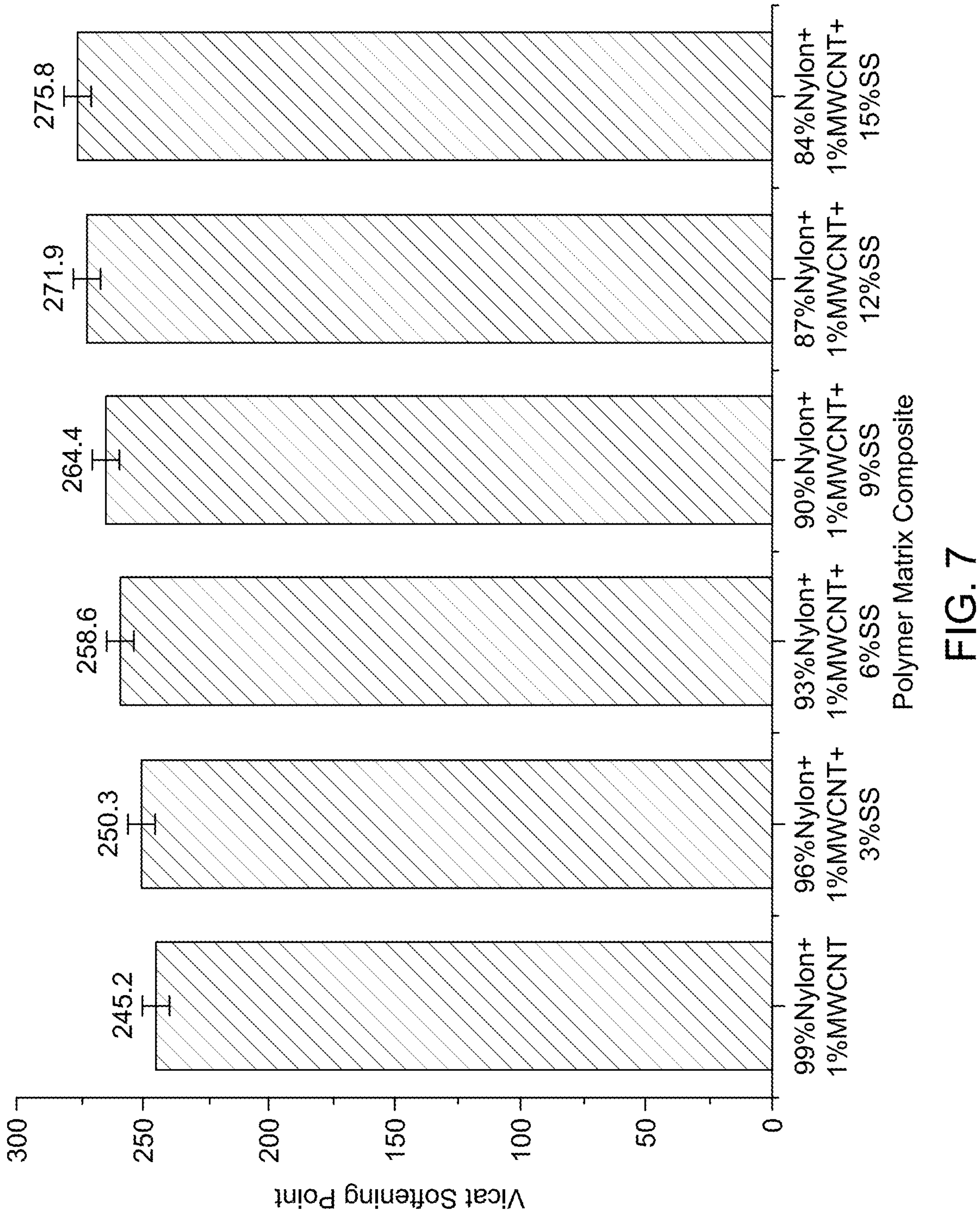
FIG. 7 shows Vicat softening point of various composites including 0%, 3%, 6%, 9%, 12%, 15% of the SSs, according to certain embodiments.

The softening temperature or point of polymer substances is a functional attribute. The Vicat softening point determines when the material becomes weak and can break or fail. ASTM D1525 standard was followed to perform the test, and the results are shown in FIG. 7.

The higher the SSs blended with the nylon 66 mixture, the higher the softening point. The presence of SSs in nylon 66 improved its thermostability. In the MWCNT-nylon 66 composite, when 3% SSs were added, an increase in Vicat softening point by 2.08% was observed, whereas a further increase of 3.32% was noticed with an increase in SS content to 6%. With the further addition of SSs in the MWCNT-nylon 66 matrix by 9, 12, and 15%, the Vicat softening point was further increased by 2.24, 2.84, and 1.43%. The greater bonding of SSs in the MWCNTs added nylon 66 composite was the prime reason for increased temperature withstanding ability, making the composite more resistant to temperatures.

Example 10: Coefficient of Linear Thermal Expansion Measurements

Across numerous applications combining two distinct materials, the coefficient of linear thermal expansion (CLTE) provides valuable information. Due to the sheer wide range of thermal expansion in polymers, expansion differs from one material to another and is influenced by the quantity and kind of supplements or reinforcements. The CLTE is a metric when choosing polymers for high-precision industrial purposes. Parts designed for operation over a broad temperature region, particularly, should have dimensional accuracy that compensates for the thermal expansion properties of the polymer employed. ASTM D696 was adopted for determining CLTE.

Figure 8:
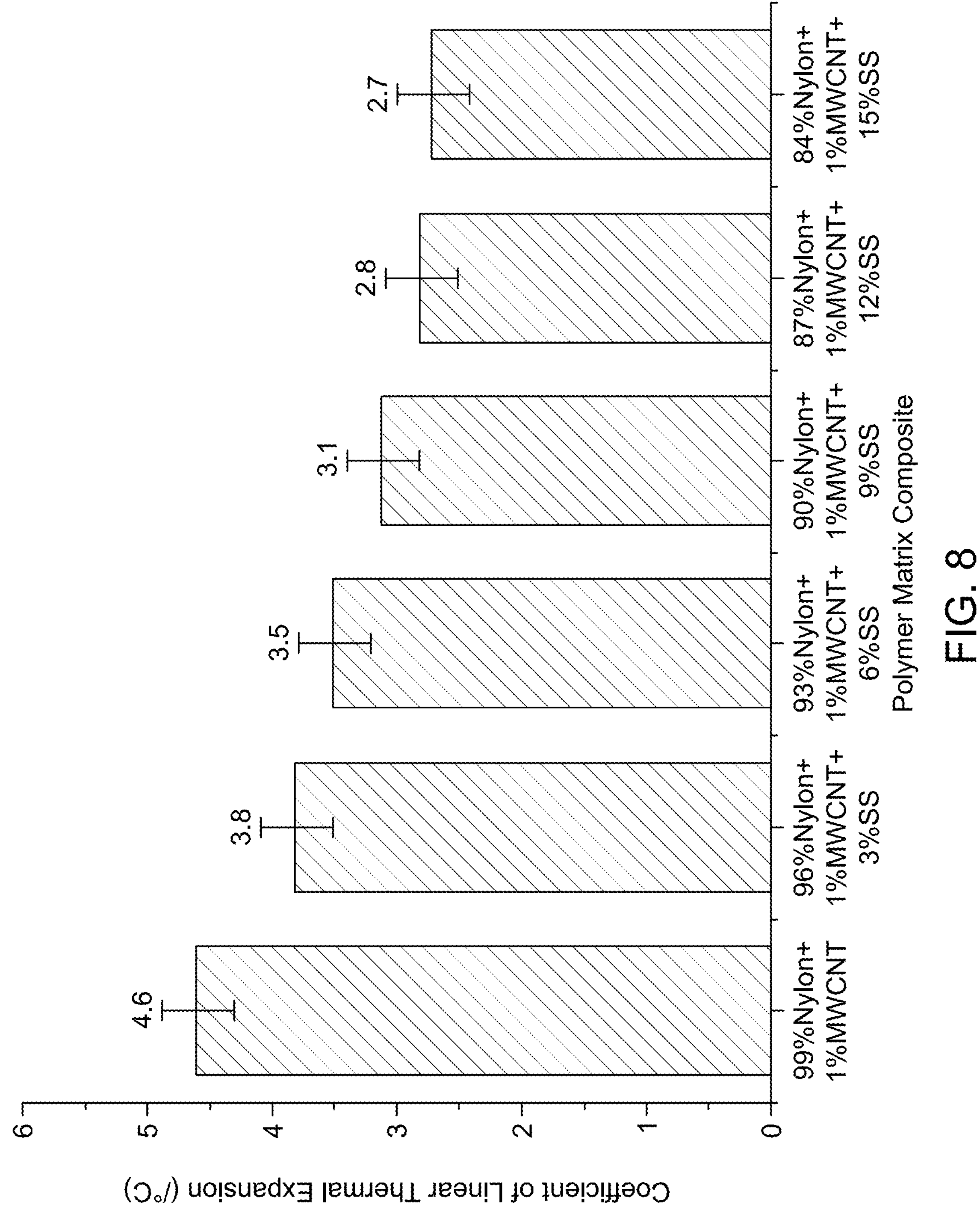
FIG. 8 shows the coefficient of linear thermal expansion of various composites including 0%, 3%, 6%, 9%, 12%, 15% of the SSs, according to certain embodiments.

The CLTE variations for different specimens are given in FIG. 8. CLTE decreases with the increase in the addition of SSs and MWCNTs in the matrix of nylon 66. A reduction in CLTE by 17.39% occurred with the incorporation of 3% SSs, and further augmentation of SS to 6% produced lower CLTE by 7.89%. Still adding SSs in the matrix of MWCNTs-nylon 66 composite the CLTE is lowered further. For the 9, 12, and 15% addition of SSs, the CLTE is reduced by 11.43, 9.68, and 3.57%, respectively. The results show that the composite's thermal stability is higher, with the addition of SSs in the MWCNT and nylon 66 matrix due to the higher bonding of particulates to the matrix.

Example 11: Heat-Deflection Temperature Measurements

Heat-deflection temperature (HDT) (also known as deflection temperature under load) is a feature that provides information on the temperature when a component begins to deform under load. It cannot be utilized to determine a material's thermal endurance. Since this measures a material's stiffness, the HDT can be altered by including reinforcing elements. The ASTM D648 standard was used to evaluate HDT. Softening or relaxing is also a consequence of the crystallinity of the plastic.

Figure 9:
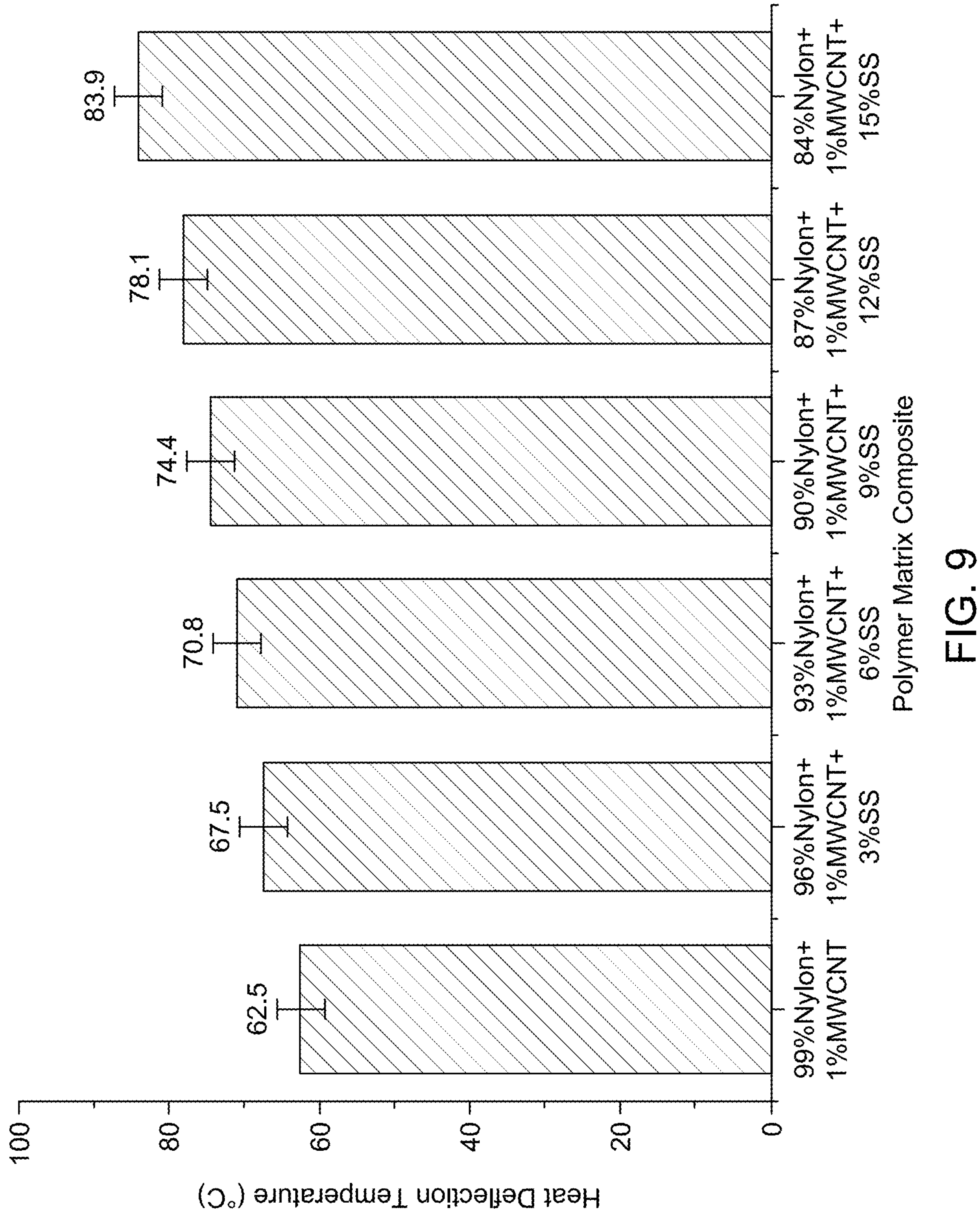
FIG. 9 shows heat deflection temperature (HDT) of various composites including 0%, 3%, 6%, 9%, 12%, 15% of the SSs, according to certain embodiments.

FIG. 9 depicts the HDT of different SSs-strengthened nylon 66 compositions. HDT rose when SS content increased. When the content of SS was added from 0 to 3%, HDT increased by 8%, and with further addition of SSs to 6%, HDT increased by 4.89%. Further addition of SSs in MWCNT-nylon 66 polymer composite showed an increase in HDT by 5.08, 4.97, and 7.43% for 9, 12, and 15% addition. This enhanced HDT was due to the increase in mechanical strength of the composite due to the addition of MWCNTs and hard SSs in the polymer matrix, which increased the glass transition temperature and crystallinity of the composite, thereby lowering the breakdown of the polymer chain while retaining its properties.

Example 12: Composite Properties and Application

Mechanical and thermal analyses of nylon 66-MWCNT-SS hybrid nanopolymer composites fabricated with a twin-screw extruder and injection molding machine were investigated. In the composites, the ultimate tensile strength increased due to the reduction in plasticity of nylon 66 by adding MWCNTs and SSs particles until 12% SSs addition. Adding 3% SS to the nylon 66-1% MWCNT composite resulted in an increase in tensile strength by 7.58 MPa. Good adhesion among SSs and polymer produced hard and brittle composites, reducing the composite material's elongation and restriction of dislocation movement.

The increase in flexural property was due to the bearing of applied load by the MWCNTs and SSs. Higher addition of SSs led to lower strength in flexural strength owing to improper bonding of SSs in nylon 66 matrix. An increase of 7.32% in flexural strength was observed when the SS content in the matrix material was increased from 0 to 3%. Shore D hardness increased with the addition of hard SS particles. A 2.33% increase in hardness was observed with a 3% addition of SS to nylon 66-1% MWCNT composite.

The impact load-bearing capacity increased with the incorporation of MWCNTs and SSs due to the restriction of dislocations by MWCNTs and the SSs taking the load more than the matrix. A substantial increase in impact strength by 16.36% was observed with a 3% addition of SS.

The higher the composition of SSs mixed with nylon 66-MWCNTs, the greater its softening point was. With the 3% inclusion of SS, the softening point was increased by 2.08%. The greater bonding of SSs in the MWCNTs added to the nylon 66 composite was the prime reason for increased temperature-withstanding ability, making the composite more resistant to temperatures. Similarly, CLTE decreased with an increase in the addition of SSs due to the higher bonding of particulates to the matrix. A reduction in CLTE by 17.39% occurred with the incorporation of 3% SSs.

HDT increased with an increase in SS content, providing better thermal stability due to the strong bonding of matrix and reinforcements, the addition of MWCNTs and hard SSs in the polymer matrix, increased the glass transition temperature and crystallinity of the composite, thereby lowering the breakdown of the polymer chain. HDT increased by 8%, and with the further addition of SSs to 6%, HDT increases by 4.89%, and a similar trend was observed until 12% addition of SSs.

Numerous modifications and variations of the present disclosure are possible in light of the above teachings. It is therefore to be understood that within the scope of the appended claims, the invention may be practiced otherwise than as specifically described herein.

The invention claimed is:

1. A composite, including:

a thermoplastic polyamide resin;

multi-walled carbon nanotubes (MWCNTs); and seashells (SSs), wherein particles of the SSs have an average size of less than 100 μm, and wherein the composite includes 80-99 wt. % of the thermoplastic polyamide resin, 0.1-1 wt. % of the MWCNTs, and 1-20 wt. % of the SSs, based on a total weight of the composite, wherein the MWCNTs and particles of the SSs are dispersed in a matrix of the thermoplastic polyamide resin, wherein particles of the SSs have an average size of 70-80 μm, wherein the thermoplastic polyamide resin is nylon 66, wherein the composite has a smooth surface morphology with protrusions from particles of the SSs, wherein the protrusions are spaced 50 μm to 500 μm apart wherein the protrusions extend out of a composite surface by 10 to 60 μm, wherein the SSs are chemically bonded to the thermoplastic polyamide resin, wherein the composite has a flexural strength of 100 to 115 MPa, and wherein the composite has a tensile strength of 90 to 100 MPa.

2. The composite of claim 1, wherein particles of the SSs include at least one of calcite and aragonite.

3. The composite of claim 1, wherein particles of the SSs are homogeneously dispersed in the matrix of the thermoplastic polyamide resin.

4. The composite of claim 1, wherein the MWCNTs have an average diameter of 10-20 nm.

5. The composite of claim 4, wherein the MWCNTs have an average length of 3-8 μm.

6. The composite of claim 1, having a Shore D hardness of at least 100.

7. The composite of claim 1, having a Vicat softening point of at least 270° C.

8. The composite of claim 1, having an elongation of less than 45%.

9. The composite of claim 1, including 87 wt. % of the thermoplastic polyamide resin, 1 wt. % of the MWCNTs, and 12 wt. % of the SSs, based on a total weight of the composite.

10. The composite of claim 1, wherein the protrusions are spaced 75 μm to 400 μm apart.

11. The composite of claim 1, wherein the protrusions extend out of a composite surface by 20 to 50 μm.

12. The composite of claim 1, including 84 to 95 wt. % of the thermoplastic polyamide resin, 0.1-1 wt. % of the MWCNTs, and 6 to 15 wt. % of the SSs, based on a total weight of the composite.

13. The composite of claim 1, wherein the SSs are chemically bonded to the thermoplastic polyamide resin through covalent bonds between the calcium carbonate of the SSs and the amide groups in the thermoplastic polyamide resin.

14. An automotive door panel, including the composite of claim 1.

* * * * *